United States Patent [19]

Bakal

[11] Patent Number: 4,459,316

[45] Date of Patent: Jul. 10, 1984

[54] SWEETENING FOODS WITH NON-CALORIC DI- OR TRISACCHARIDES HAVING L-HEXOSE COMPONENT

[75] Inventor: Abraham I. Bakal, Parsippany, N.J.

[73] Assignee: Cumberland Packing Corp., Brooklyn, N.Y.

[21] Appl. No.: 354,456

[22] Filed: Mar. 5, 1982

[51] Int. Cl.³ .......................... A23L 1/09; A23L 1/236
[52] U.S. Cl. ....................................... 426/658; 127/30; 424/361; 426/804; 536/1.1
[58] Field of Search .................... 426/658, 804; 127/30

[56] References Cited

U.S. PATENT DOCUMENTS 4,262,032 4/1981 Levin .................................. 426/658
4,421,568 12/1983 Huibers ............................. 127/30 X

OTHER PUBLICATIONS

Dick, William E. et al., Carbohydrate Research, 36(2), 319–329, (Sep. 1974).

*Primary Examiner*—Sidney Marantz
*Attorney, Agent, or Firm*—Steinberg & Raskin

[57] ABSTRACT

Natural sweeteners are provided which are non-nutritive and therefore non-caloric because the same are not metabolized by the human body. These sweeteners comprise a disaccharide formed of a levo-hexose and a dextro-hexose. The most preferred non-metabolizable disaccharides of the invention are the disaccharide of L-fructose with D-glucose, or the disaccharide of L-glucose with D-fructose. These disaccharides would be known as D, L-sucrose and L, D-sucrose, respectively.

5 Claims, No Drawings

SWEETENING FOODS WITH NON-CALORIC DI- OR TRISACCHARIDES HAVING L-HEXOSE COMPONENT

BACKGROUND OF THE INVENTION

The natural sweeteners such as cane sugar and beet sugar are actually D-sucrose. These sweeteners are preferred because they are natural and because they provide the most natural and desirable sweetening taste.

However, for diabetics, and in recent times for use in dietary regimens, e.g. for the obese, it is necessary to cut down and reduce the intake of sugars. This has been most commonly accomplished by the use of artificial sweeteners such as saccharine. There have, however, been objections to the use of artificial sweeteners, and there has been constant research to find natural sweeteners to provide the sweetening effect without the calories.

SUMMARY OF THE INVENTION

It is accordingly a primary object of the present invention to provide non-metabolizable natural sweeteners which give the taste of cane sugar and beet sugar without providing the calories thereof.

It is another object of the present invention to provide foods sweetened with non-metabolizable natural sweeteners.

It is yet a further object of the present inventio to provide a method of sweetening by the use of the non-metabolizable sweeteners of this invention.

Other objects and advantages of the present invention will be apparent from a further reading of the specification and of the appended claims.

With the above and other objects in view, the present invention mainly comprises D, L-disaccharides or L, D-disaccharides which are sweet but not metabolized and therefore non-nutritive.

It is a further object of the present invention to provide D,L-sucrose or L, D-sucrose to effect sweetening without calories.

It is still a further object of the present invention to provide for the production of these non-metabolizable sweeteners.

With the above and other objects in view, the present invention mainly comprises D, L-disccharides or L, D-disaccharides, particularly D, L-sucrose or L, D-sucrose which disaccharide provides sweetness without calories.

It has been found that the human body metabolizes only the D-configuration of the disaccharides or higher saccharides. On the other hand, the L-sugars are not metabolized.

Attempts to take advantage of this fact by providing for L-sucrose, i.e. sucrose formed from L-glucose and L-fructose, have resulted in such non-metabolizable sugars. These L-disaccharides are in fact non-nutritive sweeteners because they are not absorbed by the human body which is unable to split these sugars into their simple form. However, the preparation of these L-disaccharides is extremely complicated and time consuming and therefore the resulting L-disaccharides are very costly.

The use of L-hexoses such as L-dextrose or L-fructose for sweetening purposes without providing nutrition is unsatisfactory because these L-hexoses are absorbed and circulate in the bloodstream for a long period of time. Consequently, the L-hexoses remain in the blood over such long time that they must be eliminated through the urine and thus give positive results in testing the urine for diabetes.

I have found that it is possible to provide a natural sweetening effect with D, L-disaccharides which are sweet without being metabolized. The sweet taste of these D, L-disaccharides such as D, L-sucrose or L, D-sucrose is similar to the taste of the commonly occurring D-sucrose. However, unlike D-sucrose, the body enzymes do not break the D, L-sucrose or L, D-sucrose into the monosaccharide form so that the compound is not absorbed by the body and the same are therefore calorie free.

The present invention also provides for higher saccharides, such as tri-saccharides in which one or more of the primary monosaccharide units therof are in L-configuration. These higher saccharides can be used for their sweetening effect, although the higher saccharides are less sweet than the disaccharides, and also for their natural water binding and bulking effects.

The D, L-saccharides of the present invention provide the advantage of being non-absorbable because the enzymes or bacteria in the body do not split the molecule. Therefore, these D, L-saccharides are not caloric. In addition, as compared to the totally L-saccharides, which would also be non-absorbable and non-caloric, the D, L-saccharides of the present invention can be prepared at low cost because production thereof can be effected from a racemic mixture of D- and L-hexoses.

In accordance with the present invention, foods can be sweetened and/or bulked by the addition of D, L- or L, D-saccharides (disaccharides or higher) thereto. The term "food" as used herein also includes, of course, beverages such as coffee, tea, sodas, etc. The sweetening and/or bulking effect is therefore achieved in a natural manner without the addition of calories.

DESCRIPTION OF THE PREFERRED EMBODIMENTS

The present invention is further illustrated by the following examples, the scope of the invention not, however, being limited thereto.

EXAMPLE 1

D, L-sucrose (L-fructo furanosyl-D-glucopyranoside) was prepared using the following procedure:

A suspension of molecular sieves and silver carbonate in a solution of 1, 3, 4, 6-tetra-0-benzyl-L-fructofuranose in dry benzene was stirred under inert atmosphere in the dark. Dry silver perchlorate was added to the mixture while stirring. A solution of 2,3,4,6-tetra-0-benzyl-D-glucopyranosyl chloride was added dropwise. The reaction mixture was filtered with a filtering aid and charcoal. The residue was washed with dry benzene and the filtrate was collected and combined. The filtrate was passed through a silica gel column and eluted with a benzene ether mixture. The fractions containing the two fast components were combined and evaporated. The material was passed through a second column using 25 parts benzene and 1 part ether to elute the components. The faster moving component was determined as the D,L-sucrose.

EXAMPLE 2

L,D-sucrose (B-D-fructofuranosyl-L-glucopyranoside) was prepared as in example 1 except that 1,3,4,6- tetra-0-benzyl-D-fructofuranose and tetra-0-benzyl-L-glucopyranosyl chloride were used.

EXAMPLE 3

The compounds D,L-sucrose and L,D-sucrose were tasted by a panel and were found to be sweet, having sweetness characteristics similar to sucrose.

EXAMPLE 4

A sample of both compounds were evaluated for metabolism using a standard enzyme test. No free glucose or fructose were detected after incubation for 24 hours at 37° C.

This indicates that these compounds are not absorbed and are thus considered to be calorie free.

EXAMPLE 5

Two teaspoons of D, L-sucrose were added to coffee and tasted by a panel in comparison with two teaspoons of ordinary sucrose (cane sugar). The panel could find no observable difference.

Similarly, cakes were baked substituting D, L-sucrose and L, D-sucrose for ordinary cane sugar. Not only was the sweetness of the cake the same as obtained with the use of cane sugar, but also the bulking effect was the same.

While the invention has been described in particular with respect to specific examples of the use of the D,L-saccharides, it is apparent the variations and modifications of the invention can be made. Such variations and modifications are meant to be comprehended within the scope of the present invention.

What is claimed is:

1. Method of sweetening and bulking foods without adding calories thereto, which comprises adding to a food a disaccharide or trisaccharide formed of hexoses and having at least one L-hexose component and at least one D-hexose component.

2. Method of sweetening and bulking foods without adding calories thereto according to claim 1 wherein what is added to the food is a disaccharide.

3. Method of sweetening and bulking foods without adding calories thereto according to claim 1 wherein what is added to the food is L, D-sucrose or D, L-sucrose.

4. A sweetened and bulked food without added calories comprising a foodstuff having added thereto a disaccharide or trisaccharide formed of hexoses and having at least one L-hexose and at least one D-hexose component.

5. A sweetened and bulked food without added calories, comprising a foodstuff having added thereto L,D-sucrose or D,L-sucrose.

* * * * *